Patented Aug. 25, 1942

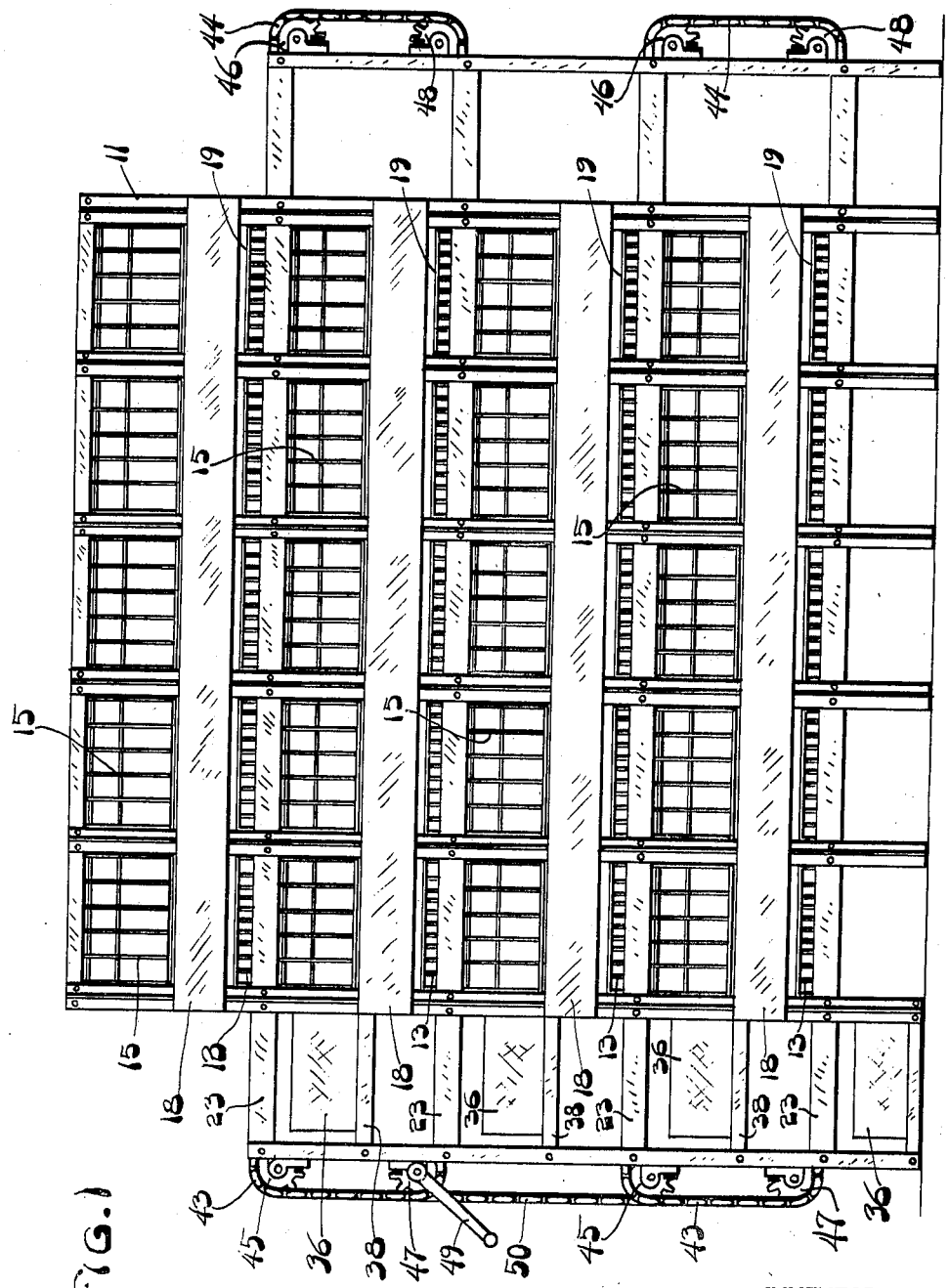

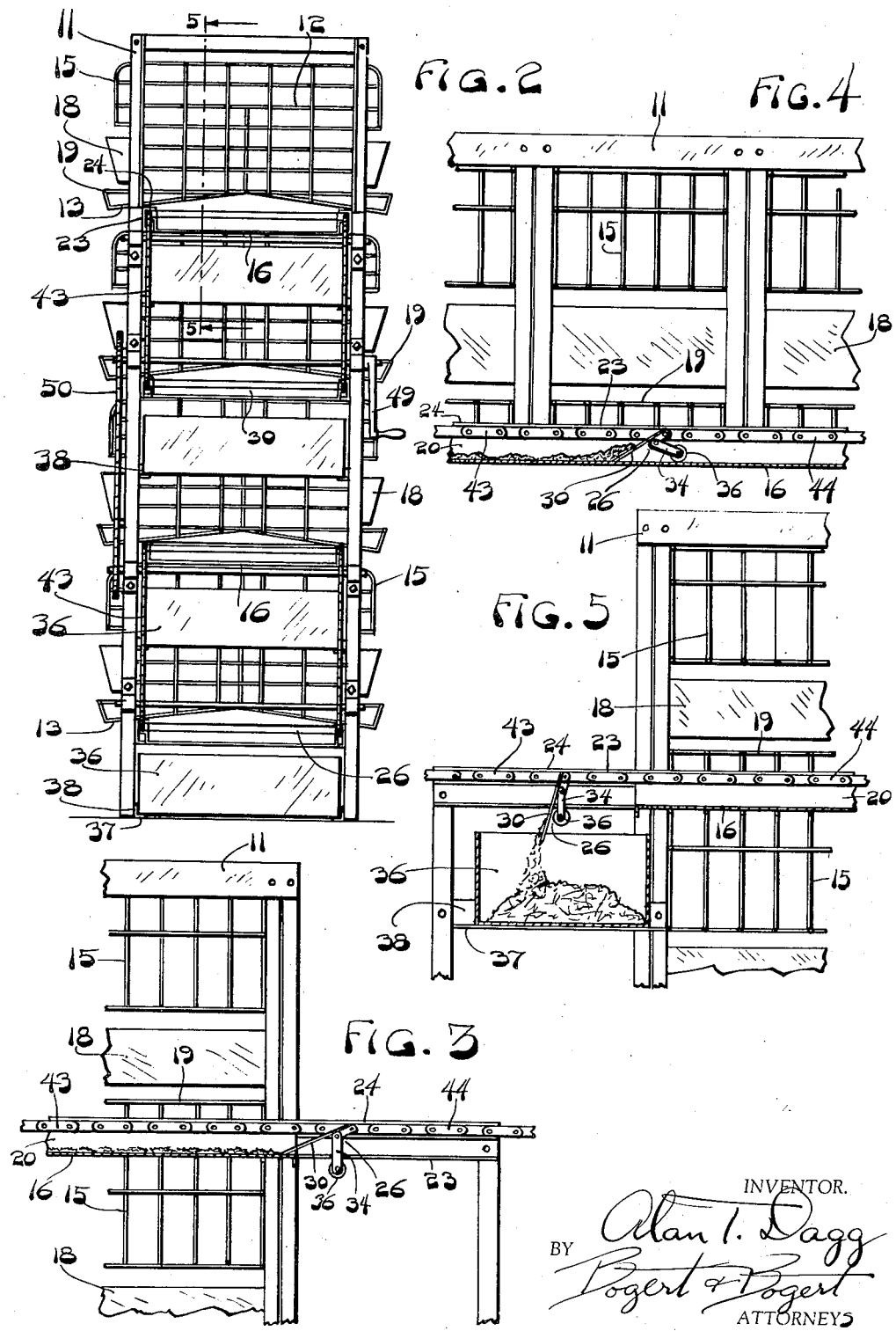

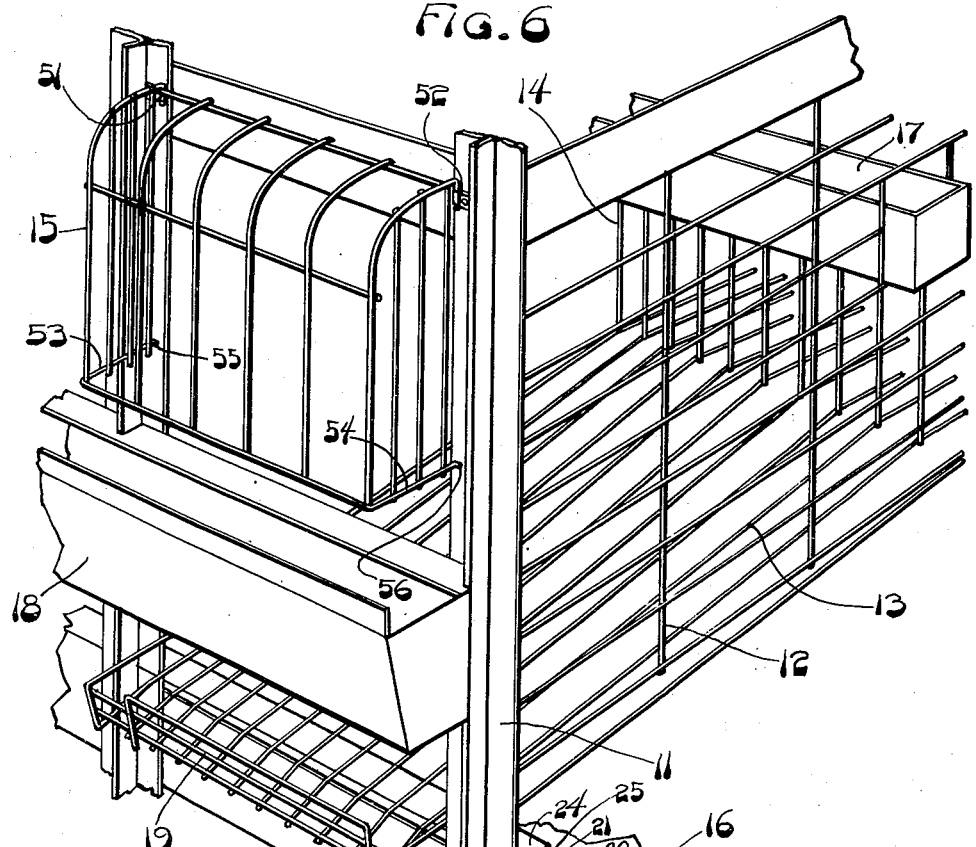
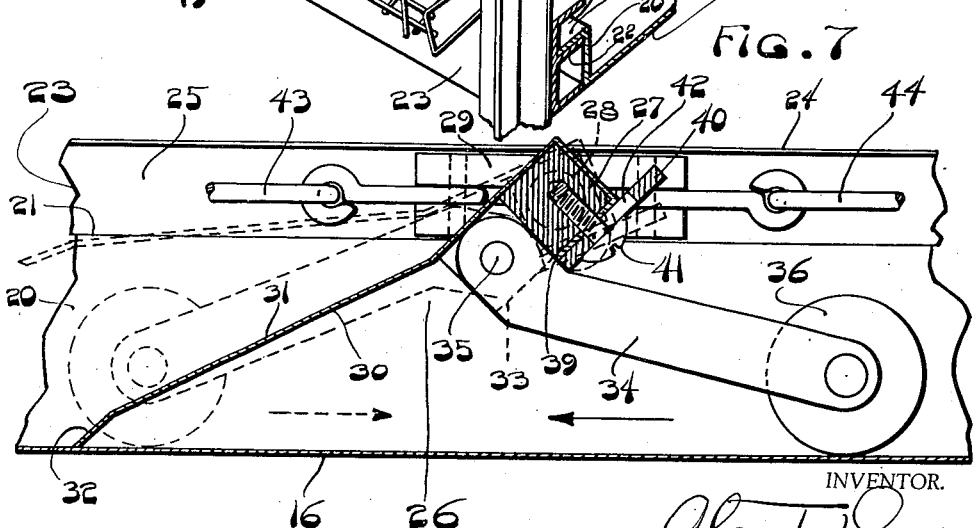

2,294,025

UNITED STATES PATENT OFFICE 2,294,025

LAYING CAGE BATTERY FOR POULTRY

Alan T. Dagg, Canonsburg, Pa., assignor to The Budke Stamping Company, Canonsburg, Pa., a corporation of Pennsylvania Application July 26, 1939, Serial No. 286,507

4 Claims. (Cl. 119—48)

This invention, which was devised as an improvement over similar structures of the general type exemplified in United States Letters Patent Number 2,096,356 of October 19, 1937, to Albert O. Fox and covering a Poultry laying battery, has for an object to produce a droppings cleaning mechanism of simplified and more efficient construction and operation, and for a further object to produce an improvement in the cage structure, wherein, without increasing structural dimensions, greater freedom of movement for the poultry is obtained, wherein greater ease of feeding is obtained, wherein the health of the hens is assured over greater periods of time than heretofore, and wherein conditions most favorable to increased egg production have been incorporated.

These and other objects are attained in the laying cage battery for poultry about to be described and which is illustrated in the accompanying drawings, in which:

Fig. 1 is a side elevation of a laying cage battery embodying the features of novelty constituting my invention.

Fig. 2 is a front elevation of the structure shown in Fig. 1.

Fig. 3 is a fragmental portion of the structure shown in Figs. 1 and 2, showing the rear of the battery at the top two rows of cages in order to disclose the start of the operation by means of which the droppings are cleaned from the tray, the view being taken somewhat in a sectional plane as might be represented by the line 5—5 of Fig. 2.

Fig. 4 is a fragmental portion of the structure shown in Figs. 1 and 2, showing a midsection of the battery, as would be observable at that point if taken on the line 5—5 of Fig. 2, in order that the cleaning of the droppings may be seen as the work progresses.

Fig. 5 discloses a view of the character of Figs. 3 and 4, but showing the front of the battery so that the completion of the droppings cleaning operation may be observed.

Fig. 6 is an enlarged fragmental perspective view of details of the cage units of which the battery is composed, and embodying a modification which I shall describe presently.

Fig. 7 is a materially enlarged fragmental transverse section of the droppings tray cleaner which constitutes an important feature of my invention.

In the structure I have disclosed, the assembly comprises a series of stories of cages. A convenient grouping for height and accessibility comprises cages arranged in four stories of several cages each, as shown in Fig. 1. The frame 11 of the structure may consist of suitable light structural members of sheet material formed to desired shape. This constitutes the skeleton of the battery upon which the cage elements and cleaner mechanism parts are assembled for cooperative functioning.

The cages each may consist of sides 12, a bottom 13, a back end 14, and a front end 15, all of which are of wire in woven or welded mesh form, while a top for the cages of each story may be the continuous metal sheet which extends from end to end of the frame between the stories of cages and which constitutes the droppings tray 16 beneath each row of cages immediately above.

The back end of each cage is used in common with an adjacent cage which faces in the opposite direction, and may be topped with a trough 17, if desired, for use as a source of drinking water for the fowls, as suggested in Fig. 6. However, the front end of each cage is independent of any other cage and consists of the outwardly bulged extension 15 beyond the frame 11 of the battery, with a food trough 18 located in spaced relation to the open under side of the extended front 15 to afford access to the troughs for filling purposes.

Each cage bottom 13 extends beneath the feed trough which lies immediately above it and, occupying a downwardly inclined position, thereby is spaced from the trough, the forward end of the bottom terminating in an upward barrier 19. The barrier affords a space between it and the front wall of the trough so as to permit access to eggs which have been laid on the inclined bottom and which have rolled to become stopped by the barrier.

I shall now describe the means by which cleaning of the droppings from beneath each of the cages is accomplished. Beneath the horizontal alignment of cages in each story of the structure I have placed one of the long droppings trays 16. These trays each have upturned flanges 20 which extend the length of each tray edge, with outwardly turned flanges 21 to support the tray on the middle flanges 22 of the double channel members 23 extending the length of the battery frame 11. The upper flange 24 of each double channel supports the forward edge of each cage bottom, as shown in Figs. 2 and 6, while the upper channel 25 of each channel member carries important parts which I shall now describe.

Each tray 16 of the battery is equipped with a scraper, and, in the drawings, these scrapers are designated by the general reference numeral 26, being shown in Figs. 2 to 7 inclusive. Each scraper depends from a supporting bar 27 which extends across the tray 16 located beneath it, the ends of the bar being pivoted by shaft ends 28 mounted in blocks 29 which slide in the upper channels 25 of the channel members 23 of the frame. The means for moving these scraper-carrying blocks 29 in their respective upper channels 25 will be described presently. Upon each bar 27 a scraper blade 30 of sheet metal is mounted, the sheet metal portion 31 which constitutes the body of the blade, being yielding in character, while the edge portion 32 occupies a slightly bent or angular relationship thereto to stiffen the scraper along the edge which contacts the tray 16. The bar 27 is provided with lugs 33 at its ends, within which arms 34 are pivoted at one end as at 35, and which arms carry at their opposite ends a roller 36 which rolls over its cooperating tray surface adjacent to its vertical flanges 20.

Since arms 34 are pivoted at 35, they may roll over their respective tray surfaces in either the full line position shown in Fig. 7 or in the dotted line position also shown in Fig. 7. When in the full line position the scraper blade is held by the roller into scraping contact with the tray, and when in the dotted line position the blade occupies the lifted relationship with the tray by virtue of abutment of the arm with the under side of the blade. Thus, the scraping position of the blade and roller enables the scraper to be advanced in the direction of the full line arrow in Fig. 7 and to cause the droppings on the tray to be lifted therefrom and carried toward the forward end of the battery where both the scraper blade and roller leave the tray and hang from the shaft ends 28, whilst the pile of accumulated droppings collected by the blade is deposited into a pan 36 removably supported by the flanges 37 of angle irons 38 forming part of the battery frame 11, all as shown in Fig. 5.

Now that the droppings collecting movement of the scraper has been completed and the droppings have been disposed of, it is obvious that restoration of a condition of operation of the scraper is necessary. This is accomplished easily merely by moving the scraper in a reverse direction through sliding its mounting blocks in the direction of the dotted line arrow in Fig. 7. This causes the roller arms and rollers of the scraper first to engage the forward edge of the tray and as the rollers are thereby brought to roll along the tray surface to force the scraper blade to become lifted with its edge 32 free of the tray so as to ride free clear back to the rear of the tray, where the rollers drop off the tray surface and hang free, while the blade thereby is permitted to drop with its edge on the extreme rear edge of the tray surface ready for another scraping transit of the tray. As the scraper starts back on its scraping movement toward the front of the tray, the roller arms 34 engage the rear edge of the tray and lift the rollers to position on the tray surface.

Because of abutment of arm edges 39 with the adjacent surface of bar 27 the passage of rollers 36 onto the tray surface will tend to give bar 27 a slight rotation, thereby placing a slight tension on blade 30 and creating a flexing tendency throughout the blade length, whereby it will scrape the tray surface thoroughly, much as a putty knife or razor blade would be used in removing paint from glass and the like. This blade flexing action may be insufficient, in which event I have provided that it may be increased by equipping bar 27 with an adjustable plate 40 at each end, where the arms 34 may engage them after they have been adjusted through the provision of a screw 41 which operates in a slot 42 in each plate.

Now I shall describe the means by which the scrapers are moved. I have referred to the movable mounting of the scrapers by means of the blocks 29. All that has to be done is to provide each block with chain connections 43 and 44 fore and aft of the block and to lead such chains to suitable means by which the scrapers may be moved. For this purpose I provide suitable sprockets 45 and 46 at the respective front and rear ends of the battery frame, over which the respective chains 43 and 44 may pass. Then, for the chains of the next lower scraper mechanism I provide sprockets 47 and 48. However, it will be noticed that the chain 43 of one scraper extends around the sprockets 45 and 47 and becomes the chain 43 of the scraper next below, while the chain 44 of the upper scraper extends around the sprockets 46 and 48 and becomes the chain 44 of the scraper next below. Therefore, by providing a suitable means such as the crank 49 on the end of one of the sprocket shafts, the operation of a pair of scrapers may be effected, one being moved to scrape its tray clean while the other is being returned to be ready for the next cleaning operation. If desired, the pairs of scrapers throughout the entire battery may be connected and operated as a group through the mere connection of a supplementary chain which transmits the power of crank 49 to all scrapers simultaneously.

The cages, as is common practice, employ sloping bottoms 13, as Figs. 2 and 6 disclose, which terminate in barriers 19 which catch the eggs which have been laid on the bottoms. These barriers are located sufficiently ahead of the front edges of the feed troughs 18 that ready access to the eggs may be had. The cage fronts 15 are shaped as bulged extensions which effectually increase the length of the cages so that several important functions are performed thereby, namely, the fowl is permitted perfect freedom of access to its food in the trough 18, without having to reach the food by having to place its head between cage wires and thereby ruffling its feathers, irritating its neck and breast to the point of soreness, catching its comb and wattles and making them sore, and in gaining this freedom it is permitted also to eat freely and without worry, thereby contributing materially to the efficiency of the hen in its production of eggs. Then, the added freedom which the fowl experiences by having its tail feathers away from wires when it faces the drinking trough 17, is important, as might be readily understood.

This bulged cage front also may be utilized as a means of permitting access to the cage for the placement and removal of birds, for which purpose a simple mounting for the front may consist of having the top side wires of the front hooked to engage clips 51 and 52 attached to the vertical frame members, with the lower side wires 53 and 54 kinked or crooked at their ends so as to snap within holes 55 and 56 in the vertical frame members when pressed into position. It will be observed that the bulged front does not extend to the upper surface of the feed trough, thereby leaving a space between the bottom wire of the front and the top of the trough, which will permit of trough cleaning, filling, and the like.

Having set forth the structural details and features of novelty embodied in the laying cage battery for poultry which I have illustrated and described above, I claim:

1. In a laying cage battery for poultry the combination of a series of cages arranged in a series of rows occupying superposed relationship to each other, a droppings tray beneath each row and extending throughout its length, guides on the sides of the trays, cleaner blades, blocks in the guides and mounting the blades for movement along the trays, and roller supports attached to the blades, adapted when the blades are being moved in one direction to hold them into scraping relationship with the tray surfaces, and when being moved in the opposite direction to hold them from scraping relationship with the tray surfaces.

2. In a laying cage battery for poultry, the combination of a series of cages arranged in a series of rows occupying superposed relationship to each other, a droppings tray beneath each row and extending throughout its length, guides on the sides of the trays, cleaner blades, blocks in the guides and mounting the blades pivotally, roller arms pivotally attached to each blade and adapted to occupy a two-position relationship therewith, one of said two-position relationships being such that in one position of the arms the blades will be pressed and held into scraping position on the trays during the cleaning movement, the other of said two-position relationships being such that in the other position of the arms the blades will be lifted and held from scraping position on the trays during their return from completion of the scraping operation.

3. In a laying cage battery for poultry, the combination of a series of cages, a frame supporting the cages in pairs of rows occupying superposed relationship to each other, a droppings tray beneath each of the rows of cages and extending throughout the length of each row, a cleaner extending transversely of each tray and mounted to be moved from end to end of said tray while occupying said transverse relationship, whereby droppings on the trays will be removed therefrom as the cleaners are moved in one direction over said trays, pans at the ends of the trays at which the cleaning thereof terminates, to receive the droppings removed from the trays, and means for moving the cleaners jointly in opposed directions over the trays of each pair, said means consisting of flexible elements connecting the cleaners of adjacent trays of each pair and extending throughout the length of the trays, whereby a looped relationship of elements and cleaners for the trays of each pair of rows is established, with the cleaners occupying uniform spacing in the loop, and whereby said joint movement will occasion opposed movement of the cleaners in each pair, one of said cleaners moving to clean its associated tray simultaneously with return of its loop-connected cleaner preparatory to another cleaning of the associated tray.

4. In a laying cage battery for poultry, the combination of a series of substantially identical cages, a frame supporting the cages in substantially identical rows occupying superposed relationship to each other, substantially identical droppings trays extending the length of the rows and beneath each row, and a cleaner blade extending transversely of each tray, said blade being mounted pivotally to be pressed against and moved the length of its associated tray in one direction and to be lifted from and moved the length of its associated tray in the opposite direction, means for moving each blade over its associated tray, and means on each blade functioning independently of said first mentioned means, adapted to press the blade on its tray for the cleaning operation and to lift the blade from its tray for return from its cleaning operation.

ALAN T. DAGG.